UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

YELLOW DYE AND PROCESS OF MAKING SAME.

955,080.

Specification of Letters Patent.   Patented Apr. 12, 1910.

No Drawing.   Application filed December 14, 1909.   Serial No. 533,107.

*To all whom it may concern:*

Be it known that we, PAUL JULIUS, Ph. D., and ERNST FUSSENEGGER, Ph. D., chemists, subjects of the Emperor of Austria-Hungary, residing at Ludwigshafen-on-the-Rhine, Germany, have invented new and useful Improvements in Yellow Dyes and Processes of Making Same, of which the following is a specification.

In the specification of Letters Patent No. 932,266 is described the production of coloring matter by treating 3-chlor-6-nitranilin with formaldehyde, the coloring matter so produced being suitable for use as a pigment, or lake, the color being a beautiful yellow with a greenish tinge and being fast against the action of light, lime, water, and alcohol.

We have now discovered that by treating 4-chlor-6-nitranilin with formaldehyde, a coloring matter suitable for use as a pigment, or lake, is obtained, which coloring matter possesses properties generally similar to those possessed by the coloring matter obtainable from 3-chlor-6-nitranilin and formaldehyde, but its color is yellow with a reddish tinge. It is also very fast against the action of light.

Our new coloring matter possesses a composition corresponding to the formula

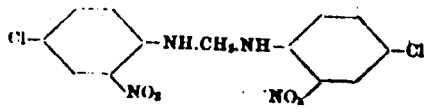

It is fairly difficultly soluble in hot xylene and melts at about 262° C.

The following is an example of how our invention can be performed, but the invention is not confined to this example: Heat together in a closed vessel, at a temperature of from seventy, to eighty, degrees centigrade, and while stirring, three hundred and forty-five parts by weight of a ten per cent. paste of 4-chlor-6-nitranilin and thirty parts by weight of a thirty per cent. formaldehyde solution. When, from a test portion, it is seen that no diazotizable base is present, the mass is allowed to cool and the product is filtered off and washed.

Now what we claim is:—

1. The process of producing coloring matter by treating 4-chlor-6-nitranilin with formaldehyde.

2. As a new article of manufacture, the coloring matter which can be obtained by treating 4-chlor-6-nitranilin with formaldehyde which coloring matter possesses a beautiful yellow color with a reddish tinge, is fairly difficultly soluble in hot xylene, melts at about 262° C., and possesses a composition corresponding to the hereinbefore defined formula $C_{13}H_{10}O_4N_4Cl_2$.

In testimony whereof we have hereunto set our hands in the presence of two subscribing witnesses.

PAUL JULIUS.
ERNST FUSSENEGGER.

Witnesses:
J. ALEC. LLOYD,
W. W. SCHMIDTZ.